United States Patent

Miletto et al.

(10) Patent No.: US 9,915,347 B2
(45) Date of Patent: Mar. 13, 2018

(54) CASSETTE SEAL

(71) Applicant: Carl Freudenberg KG, Weinheim (DE)

(72) Inventors: Stefano Miletto, Cavour (IT); Luca Breusa, Pomaretto (IT); Francesco Vignolo, Bibiana (IT); Pasquale Angiulli, Riva de Pinerolo (IT); Antonio Turaglio, Luserna San Giovanni (IT)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 14/720,980

(22) Filed: May 26, 2015

(65) Prior Publication Data
US 2015/0337961 A1 Nov. 26, 2015

(30) Foreign Application Priority Data

May 26, 2014 (EP) .................................... 14169871

(51) Int. Cl.
*F16J 15/00* (2006.01)
*F16J 15/447* (2006.01)
(Continued)

(52) U.S. Cl.
CPC ......... *F16J 15/002* (2013.01); *F16J 15/3216* (2013.01); *F16J 15/3256* (2013.01); *F16J 15/4478* (2013.01)

(58) Field of Classification Search
CPC .... F16J 15/3256; F16J 15/002; F16J 15/3216; F16J 15/4478; F16J 15/447; F16J 15/3264

See application file for complete search history.

(56) References Cited

U.S. PATENT DOCUMENTS

| 5,209,499 | A | * | 5/1993 | Ruff, Jr. ............... | F16J 15/3256 277/551 |
| 5,813,675 | A | * | 9/1998 | Otto .................... | F16C 33/7879 277/407 |

(Continued)

FOREIGN PATENT DOCUMENTS

| CN | 104235329 A | * 12/2014 |
| EP | 0754873 A2 | 1/1997 |

(Continued)

*Primary Examiner* — Eugene G Byrd

(74) *Attorney, Agent, or Firm* — Leydig, Voigt & Mayer, Ltd.

(57) ABSTRACT

A cassette seal having an internal ring with a cylindrical portion; a cover portion radially projecting from the cylindrical portion, and a covering portion axially projecting from the cover portion, wherein the covering portion is radially spaced from the cylindrical portion, and an external ring with axial flange, and a radial flange projecting in the internal ring direction, with a sealing body of an elastomeric material associated with the axial flange, wherein from the sealing body sealing lips are formed, wherein a first sealing lip with radial preload sealingly rests against the cylindrical portion's outer circumference, wherein a second sealing lip axially projects from the radial flange and extends in the direction of the covering portion's side facing the cylindrical portion, wherein a third sealing lip axially projects beyond the radial flange and on the outer circumference at least partly projects beyond the covering portion.

20 Claims, 1 Drawing Sheet

(51) Int. Cl.
*F16J 15/3216* (2016.01)
*F16J 15/3256* (2016.01)

(56) References Cited

U.S. PATENT DOCUMENTS

| | | | | |
|---|---|---|---|---|
| 5,890,812 | A * | 4/1999 | Marcello | F16C 33/7813 |
| | | | | 384/148 |
| 5,895,052 | A | 4/1999 | Drucktenhengst et al. | |
| 6,485,185 | B1 * | 11/2002 | Conway, Jr. | F16C 19/364 |
| | | | | 384/480 |
| 6,527,276 | B1 * | 3/2003 | Phillips | F16C 33/76 |
| | | | | 277/351 |
| 8,342,535 | B2 * | 1/2013 | Lattime | F16C 33/7813 |
| | | | | 277/409 |
| 2003/0184021 | A1 * | 10/2003 | Hatch | F16J 15/3264 |
| | | | | 277/395 |
| 2004/0026867 | A1 * | 2/2004 | Adams | F16C 33/782 |
| | | | | 277/349 |
| 2009/0127795 | A1 | 5/2009 | Lattime et al. | |
| 2009/0127797 | A1 * | 5/2009 | Kanzaki | F16J 15/3264 |
| | | | | 277/565 |
| 2012/0321235 | A1 * | 12/2012 | Sierra | F16J 15/3264 |
| | | | | 384/484 |
| 2014/0246833 | A1 * | 9/2014 | Greca | F16J 15/3256 |
| | | | | 277/418 |

FOREIGN PATENT DOCUMENTS

| | | | | |
|---|---|---|---|---|
| EP | 0814288 | A1 | | 12/1997 |
| EP | 1890057 | A1 | | 2/2008 |
| JP | 19950305707 | | * 11/1995 | ......... F16C 33/7813 |
| JP | 09144767 | A * | 6/1997 | |
| JP | 2004132519 | A * | 4/2004 | |

* cited by examiner

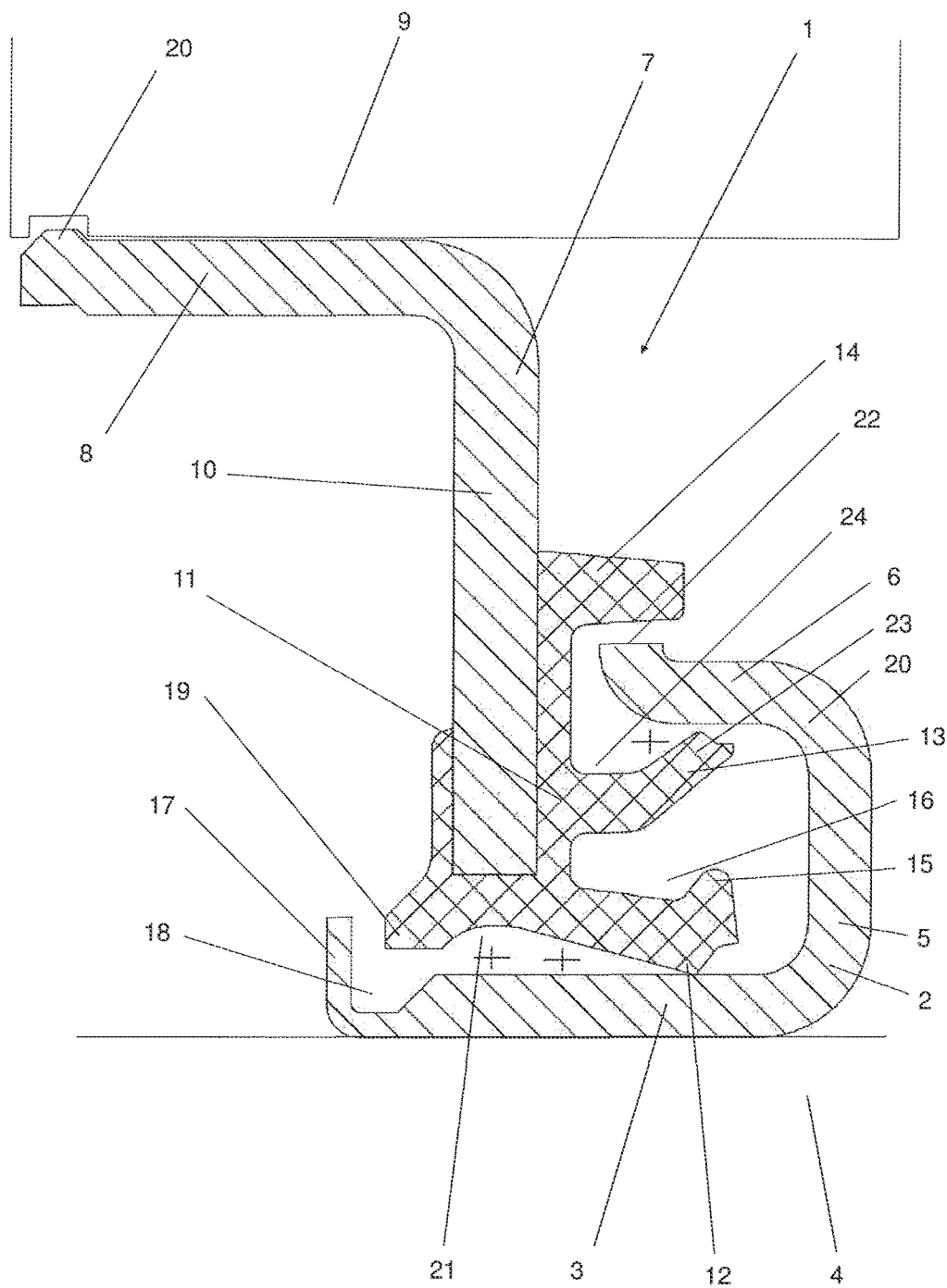

CASSETTE SEAL

CROSS-REFERENCE TO RELATED APPLICATIONS

Priority is claimed to European Patent Application No. 14169871.2, filed on May 26, 2014, the entire disclosure of which is hereby incorporated by reference herein.

FIELD

The invention relates to a cassette seal, comprising an internal ring comprising a cylindrical portion for resting against a rotating machine element, a cover portion that radially projects from the cylindrical portion, and a covering portion that axially projects from the cover portion, wherein the covering portion is radially spaced apart from the cylindrical portion, and an external ring with an axial flange for resting against a housing to be sealed off, and a radial flange, which projects in the direction of the internal ring, with a sealing body made from an elastomeric material being associated with said axial flange, wherein from the sealing body sealing lips are formed, wherein a first sealing lip with radial preload sealingly rests against the outer circumference of the cylindrical portion, wherein a second sealing lip axially projects from the radial flange and extends in the direction of the side of the covering portion, which side faces the cylindrical portion.

BACKGROUND

Cassette seals are already known from EP 0 814 288 A1. The advantage of cassette seals is that the running surface rests against the sealing lip, which is part of the seal, so that both these components can be perfectly matched to one another. Furthermore, the sealing lip rests already prior to installation in the correct position against the running surface of the internal ring so that damage to the sealing lip occurring during installation of the cassette seal on the rotating machine element can be excluded. The cassette seal is associated with a further advantage in that the internal ring covers the sealing body at least in part on the outside, thus protecting it from the ingress of excessive contamination. For this reason, cassette seals are often used in devices exposed to high loads. Examples include agricultural machinery, construction equipment or rail vehicles. All this machinery and equipment is subjected to very considerable fluctuations in temperature on the one hand, and to the ingress of undesirable media such as water on the other hand. The fact that the radially projecting part of the internal ring projects beyond the sealing lip enables the sealing lip to be encapsulated and therefore to be protected against influences entering from the outside.

However, the use of the cassette seal in low-temperature conditions is problematic. This particularly applies when the seal is subjected in parallel to the effect of water. In this context, the ingress of water into the gap between the internal ring and the external ring is undesirable.

SUMMARY

An aspect of the invention provides a cassette seal, comprising: an internal ring including a cylindrical portion configured to rest against a rotating machine element; a cover portion that radially projects from the cylindrical portion; and a covering portion that axially projects from the cover portion, wherein the covering portion is radially spaced apart from (i) the cylindrical portion, and (ii) an external ring including an axial flange configured to rest against a housing to be sealed off, and (iii) a radial flange, which projects in the direction of the internal ring, with a sealing body, including an elastomeric material, associated with the axial flange, wherein sealing lips are formed from the sealing body, wherein a first sealing lip with radial preload sealingly rests against the outer circumference of the cylindrical portion, wherein a second sealing lip axially projects from the radial flange and the second sealing lip extends in a direction of a side of the covering portion (6), which side faces the cylindrical portion, wherein a third sealing lip axially projects beyond the radial flange and, on an outer circumference of the third sealing lip, at least partly projects beyond the covering portion.

DETAILED DESCRIPTION OF THE DRAWINGS

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrate the following:

FIG. 1 schematically shows a section view of the cassette seal according to the invention.

DETAILED DESCRIPTION

An aspect of the invention relates to a cassette seal, comprising an internal ring comprising a cylindrical portion for resting against a rotating machine element, a cover portion that radially projects from the cylindrical portion, and a covering portion that axially projects from the cover portion, wherein the covering portion is radially spaced apart from the cylindrical portion, and an external ring with an axial flange for resting against a housing to be sealed off, and a radial flange, which projects in the direction of the internal ring, with a sealing body made from an elastomeric material being associated with said axial flange, wherein from the sealing body sealing lips are formed, wherein a first sealing lip with radial preload sealingly rests against the outer circumference of the cylindrical portion, wherein a second sealing lip axially projects from the radial flange and extends in the direction of the side of the covering portion, which side faces the cylindrical portion.

An aspect of the invention provides a cassette seal having improved usage characteristics in low-temperature applications.

In an aspect of the invention, a third sealing lip axially projects from the radial flange of the external ring and at least in part projects beyond the covering portion of the internal ring on the outer circumference. This results in a further gap between the third sealing lip and the covering portion of the internal ring, which prevents water and/or dirt from entering from entering as far as the first sealing lip. Consequently, premature damage, in particular in the context of low temperatures, can be avoided.

Between the second sealing lip, the covering portion and the third sealing lip, can be a labyrinth structure. The labyrinth structure can be a result of the opposing axial extension of the second sealing lip, the third sealing lip and the covering portion, wherein the covering portion projects into the space between the second sealing lip and the third sealing lip. This results in a narrow gap between the second sealing lip and the covering portion and between the third sealing lip and the covering portion, which prevents water from entering without obstacles into the space between the internal ring and the external ring.

The first sealing lip can comprise at its free end a projection that radially projects in the direction of the covering portion. Preferably, in this arrangement the first sealing lip is formed in such a manner that on the outer circumference, between the radial flange and the projection, a circumferential indentation results. The circumferential indentation, which is convex-shape, is arranged radially underneath the second sealing lip. In this arrangement, the second sealing lip is preferably designed in such a manner that a change in direction results in the region of the indentation. If dirt or water enters the gap between the second sealing lip, the third sealing lip and the covering portion, the dirt or the water slides along the second sealing lip before finally dropping into the circumferential indentation of the first sealing lip. This can prevent dirt or water from reaching the region of the first sealing lip, which rests against the internal ring.

The internal ring can be equipped with a radially outwards projecting projection. Preferably, the projection encompasses the sealing body at least in some sections. Consequently, the external ring is safely arranged between the cover portion and the projection. Installation is simplified, and unintentional release of the internal ring and the external ring can be avoided.

The projection can be equipped with a circumferential groove. Consequently, there is a circumferential indentation in this region, in which medium to be sealed off can collect. A reservoir forms that holds lubricant in the region between the internal ring and the sealing body.

From the sealing body a fourth sealing lip can be formed that projects in the direction of the projection. In this arrangement the fourth sealing lip can project in the direction of the projection and of the groove in such a manner that the aforesaid is always immersed in lubricant; and thus it is ensured that lubricant is present between the sealing body and the internal ring, and consequently improved performance characteristics result.

A circumferential projection can be arranged on the free end of the radial flange of the external ring on the outer circumference. In this arrangement, the projection is preferably designed in such a manner that it engages a congruently designed groove of the housing. Consequently, the cassette seal is particularly securely affixed in the housing and the gap between the external ring and the housing is better protected against the ingress of dirt and water.

A convex portion can be between the first sealing lip and the fourth sealing lip. In mechanical respect, this embodiment is advantageous because it results in good mobility of the first sealing lip so that the latter always rests with a radial preload against the internal ring. There is a further advantage in that the space delimited by the first sealing lip, the fourth sealing lip and the internal ring can contain a lubricant. The lubricant to be used is preferably a lubricant selected for low-temperature applications. A lubricant for highly-stressed rolling bearings and slide bearings can be considered in particular. The lubricant ensures low-friction contact between the first sealing lip and the internal ring and prevents the ingress of water and dirt.

The space delimited by the second sealing lip, the covering portion and the third sealing lip can also contain a lubricant. Here again, preferably the above-mentioned lubricant for highly-stressed rolling bearings and slide bearings is used. In this region, too, the lubricant prevents the ingress of water and dirt.

The free end of the covering portion can make a transition to a cylinder surface. This results in a particularly narrow gap between the third sealing lip and the internal ring. This is the case, in particular, when the free end has been machine finished. Furthermore, the gap, which extends in the axial direction, is relatively long so that overall good sealing behavior towards water and dirt is achieved.

The internal ring and the external ring are preferably made from a metallic material. In this application, preferably a tough steel material having good formability is used.

The internal ring and the external ring can be coated in at least some sections. In this arrangement, the coating is preferably applied to the surfaces facing the environment. The coating may be lacquer, which has corrosion-protection characteristics. Consequently, the cassette seal is also insensitive to the exposure of aggressive media such as saltwater.

One exemplary embodiment of the cassette seal according to the invention is explained below with reference to the FIGURE. The FIGURE schematically shows a section view of the cassette seal according to the invention.

The FIGURE shows a cassette seal 1 for an axle bearing arrangement of a rail vehicle. The axle bearing comprises an arrangement of rolling bearings, which are protected by cassette seals against the influence of aggressive media on the outside. In this arrangement, the cassette seal 1 is designed such that it is, in particular, suitable for the use of the rail vehicle at low-temperature conditions.

The cassette seal 1 comprises an internal ring 2 comprising a cylindrical portion 3 for resting against a rotating machine element 4, a cover portion 5 that radially projects from the cylindrical portion 3, and a covering portion 6 that axially projects from the cover portion 5. The rotating machine element 4 is, for example, a component of an axle of a rail vehicle. The covering portion 6 is radially spaced apart from the cylindrical portion 3.

The cassette seal 1 further comprises an external ring 7 with a axial flange 8 for resting against a housing 9 to be sealed off, and an radial flange 10 that projects in the direction of the internal ring 2, with a sealing body 11 made from an elastomeric material being associated with said radial flange 10.

The sealing body 11 is preferably made of an injection-moldable elastomer material. In view of the required low-temperature application, the use of a butadiene rubber, such as nitrile butadiene rubber (NBR) is preferred. Thanks to the inventive shape of the cassette seal, a good sealing performance is achieved.

The sealing body 11 is equipped with sealing lips, wherein a first sealing lip 12 with radial preload sealingly rests against the outer circumference of the cylindrical portion 3. A second sealing lip 13 axially projects from the radial flange 10 and extends in the direction of the side of the covering portion 6, which side faces the cylindrical portion 3. A third sealing lip 14 axially projects from the radial flange 10 and on the outer circumference partly projects beyond the covering portion 6.

The fact that the second sealing lip 13, the covering portion 6 and the third sealing lip 14 are arranged on top of another in radial direction, a labyrinth structure results. In this arrangement, neither the second sealing lip 13 and the covering portion 6, nor the third sealing lip 14 and the covering portion 6 touch. The free end of the covering portion 6 makes a transition to a cylinder surface 22 that extends in the axial direction. The gap formed between the third sealing lip 14 and the cylinder surface 22 can expand in the direction of the environment. This results in a pumping effect during rotation of the internal ring 3, which conveys water in the direction of the environment.

The first sealing lip 12 comprises a protrusion 15 at its free end that radially projects in the direction of the covering portion 6. This results in a circumferentially outward-projecting bead. Overall, the first sealing lip 12 is formed in such a manner that on the outer circumference between the radial flange 10 and the protrusion 15 a circumferential indentation 16 results. The indentation 16 is convex-shaped and makes it possible for water and dirt to accumulate in a region of the cassette seal 1 that is irrelevant to the sealing function.

Comparable to the first sealing lip 12, the second sealing lip 13 has a further projection 23 in such a manner that a circumferential second indentation 24 is formed. All dirt or water that passes the gap between the third lip 14 and the cylinder surface 22 is collected in the second indentation 24 in such a manner that thanks to axial symmetric geometry of the seal the dirt and water are driven outside the seal again through the gap between the third lip 14 and the cylindrical surface 22.

The internal ring 2 and the external ring 7 are made from a metallic material. In this exemplary embodiment, the internal ring 2 and the external ring 7 comprise a tough steel material. The surfaces of the internal ring 2 and of the external ring 7 face the environment and the housing 9 and comprise a corrosion-protection coating. In this case, lacquer was applied.

From the internal ring 2, a radially-outward-projecting projection 17 is formed, wherein the projection 17 is associated with a circumferential groove 18 that points in the direction of the rotating machine element 4.

From the sealing body 11, a fourth sealing lip 19 is formed, which projects in the direction of the projection 17.

A circumferential projection 20 is arranged on the outer circumference on the free end of the axial flange 8 of the external ring 7. The projection 20 is trapezoidal in shape so that simple installation of the external ring 7 is ensured. After completed installation, the projection 20 projects into a circumferential groove of the housing 9, which results in a positive fit and a stable connection between the external ring 7 and the housing 9.

Between the first sealing lip 12 and the fourth sealing lip 19, a convex portion results, wherein the space delimited by the first sealing lip 12, the fourth sealing lip 19 and the internal ring 2 contains a lubricant. Likewise, the space delimited by the second sealing lip 13, the covering portion 6 and the third sealing lip 14 comprises a lubricant. In both cases the lubricant is suitable for low-temperature applications and has been selected from the group comprising lubricants for highly-stressed rolling bearings and slide bearings.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A cassette seal, comprising:
   an internal ring including a cylindrical portion configured to rest against a rotating machine element;
   a cover portion that radially projects from the cylindrical portion; and
   a covering portion that axially projects from the cover portion, wherein the covering portion is radially spaced apart from:
   (i) the cylindrical portion, and
   (ii) an external ring including an axial flange configured to rest against a housing to be sealed off, and
   (iii) a radial flange, which projects in the direction of the internal ring, and
   a sealing body, including an elastomeric material, associated with the radial flange,
   wherein the covering portion has a free end that makes a transition in a radial direction to a cylinder surface that extends in the axial direction,
   wherein sealing lips are formed from the sealing body,
   wherein a first sealing lip with radial preload sealingly rests against the outer circumference of the cylindrical portion,
   wherein the first sealing lip includes, at a free end, a projection that radially projects in the direction of the covering portion,
   wherein the first sealing lip is formed in such a manner that a circumferential indentation is formed on an outer circumference between the radial flange and the projection of the first sealing lip,
   wherein a second sealing lip axially projects from the radial flange and the second sealing lip extends in a direction of a side of the covering portion, which side faces the cylindrical portion,
   wherein a third sealing lip axially projects from the radial flange in a direction of the cover portion and is at least partly arranged, in the radial direction, on top of at least a part of the covering portion,
   wherein a gap is formed between the free end of the covering portion that makes a transition in the radial direction to a cylinder surface that extends in the axial direction and the third sealing lip, the gap being in direct communication with the environment, and
   wherein, in a non-displaced position of the third sealing lip, a surface of the third sealing lip opposite the free end of the covering portion that makes a transition to a cylinder surface forms an angle with respect to the cylinder surface such that the width of the gap at an edge of the free end of the covering portion closest to the radial flange is less than the width of the gap at an edge of the covering portion farthest from the radial flange.

2. The seal of claim 1, wherein the first sealing lip is formed such that on an outer circumference, between the radial flange and the projection, a circumferential indentation results.

3. The seal of claim 1, wherein, from the internal ring, a radially-outward-projecting projection is formed.

4. The seal of claim 3, wherein the projection is associated with a circumferential groove.

5. The seal of claim 3, wherein, from the sealing body, a fourth sealing lip is formed,
wherein the fourth sealing lip projects in a direction of the projection.

6. The seal of claim 1, further comprising:
a circumferential projection, arranged on a free end of the axial flange of the external ring on an outer circumference.

7. The seal of claim 5, further comprising:
a convex portion between the first sealing lip and the fourth sealing lip.

8. The seal of claim 7, wherein a space delimited by the first sealing lip, the fourth sealing lip, and the internal ring, includes a lubricant.

9. The seal of claim 1, wherein a space delimited by the second sealing lip, the covering portion, and the third sealing lip, includes a lubricant.

10. The seal of claim 1, wherein the internal ring and the external ring include a metallic material.

11. The seal of claim 1, wherein the internal ring and the external ring are at least partially coated.

12. The seal according of claim 1, wherein the second sealing lip includes a further projection such that a circumferential second indentation is formed.

13. A cassette seal, comprising:
an internal ring, the internal ring including a cylindrical portion configured to rest against a rotating machine element, a cover portion that radially projects from the cylindrical portion, and a covering portion that axially projects from the cover portion;
an external ring including an axial flange configured to rest against a housing to be sealed off and a radial flange that radially projects in the direction of the internal ring; and
a sealing body forming a plurality of sealing lips, the sealing body including an elastomeric material and being associated with the radial flange,
wherein the cover portion radially projects from a first portion of the cylindrical portion, the first portion of the cylindrical portion being located in a first axial direction relative to the radial flange,
wherein a radially-outward-projecting projection radially projects from a second portion of the cylindrical portion, the second portion of the cylindrical portion being located in a second axial direction opposite the first axial direction relative to the radial flange,
wherein a circumferential groove is formed in the cylindrical portion, the circumferential groove being located in the first axial direction relative to the radially-outward-projecting projection,
wherein a first of the plurality of sealing lips has a radial preload and sealingly rests against the outer circumference of the cylindrical portion,
wherein a second of the plurality of sealing lips axially projects from the radial flange and extends in a direction of a side of the covering portion, which side faces the cylindrical portion,
wherein a third of the plurality of sealing lips axially projects from the radial flange in a direction of the cover portion and is at least partly arranged, in the radial direction, on top of at least a part of the covering portion,
wherein a fourth of the plurality of sealing lips projects from the radial flange and extends in a direction of the circumferential groove of the cylindrical portion such that a radially innermost extent of the fourth sealing lip is located in the radially inwards direction relative to a radially outermost extent of the radially-outward-projecting projection.

14. The seal of claim 13, wherein the furthest extent of the fourth sealing lip in the second axial direction is located in the first axial direction relative to the radially-outward-projecting projection.

15. The seal of claim 13, wherein the furthest extent of the fourth sealing lip in the second axial direction is located in the first axial direction relative to the second portion of the cylindrical portion.

16. The seal of claim 15, wherein the second portion of the cylindrical portion is located in the second axial direction relative to the circumferential groove formed in the cylindrical portion.

17. The seal of claim 13, wherein a first part of the fourth sealing lip is arranged, in a radial direction, on top of a portion of the cylindrical portion that is located in the first axial direction relative to the circumferential groove, and
wherein a second part of the fourth sealing lip is arranged, in the radial direction, on top of a portion of the circumferential groove.

18. The seal of claim 13, wherein a convex portion is formed between the first sealing lip and the fourth sealing lip.

19. The seal of claim 18, wherein the convex portion includes a lubricant.

20. The seal of claim 19, wherein the fourth sealing lip extends in a direction of the circumferential groove in such a manner that the fourth sealing lip is always immersed in lubricant.

* * * * *